(No Model.)
2 Sheets—Sheet 1.
W. B. NORTH.
COTTON PRESS.
No. 5,632.   Patented June 13, 1848.
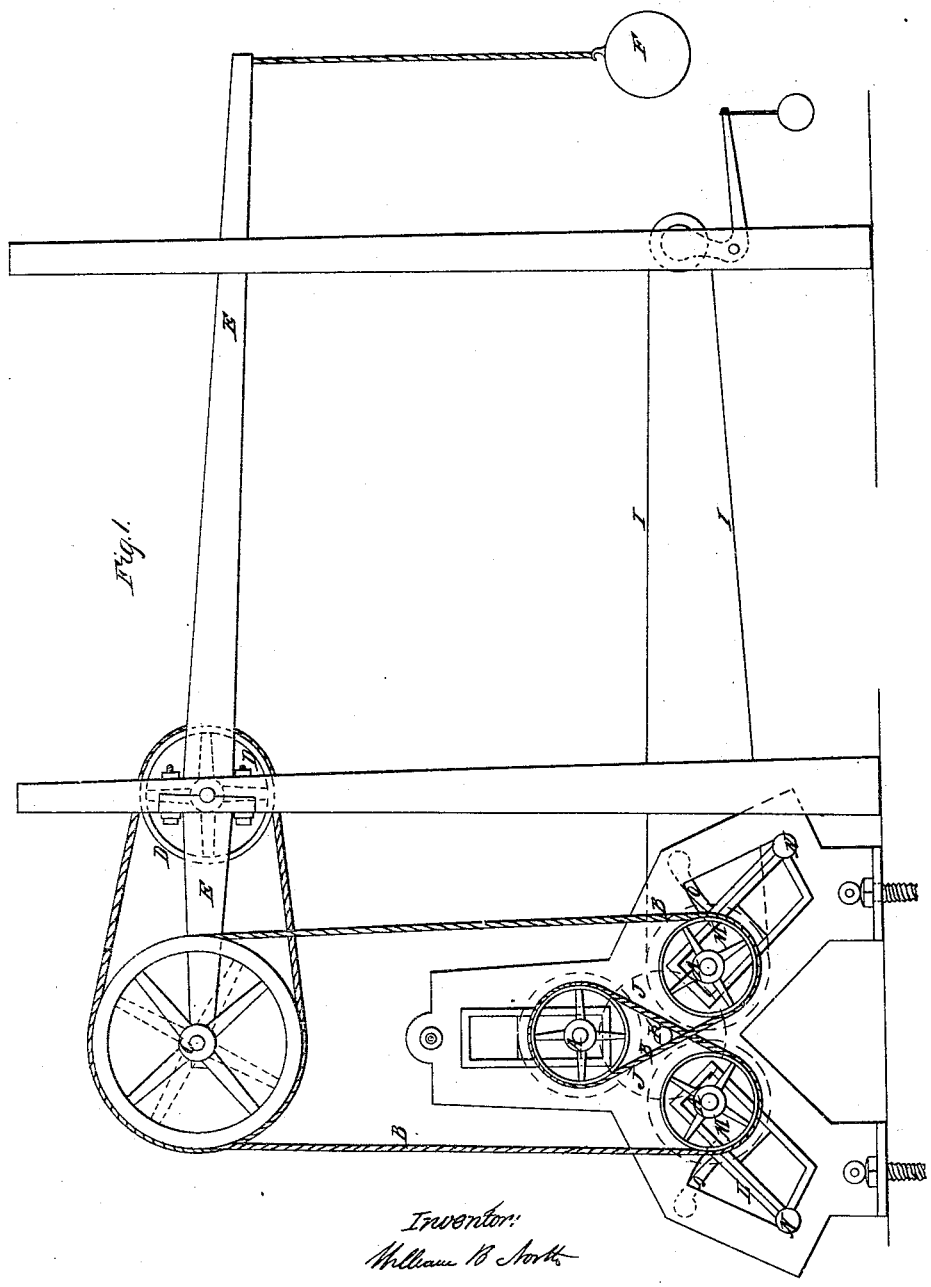
Inventor:
William B. North

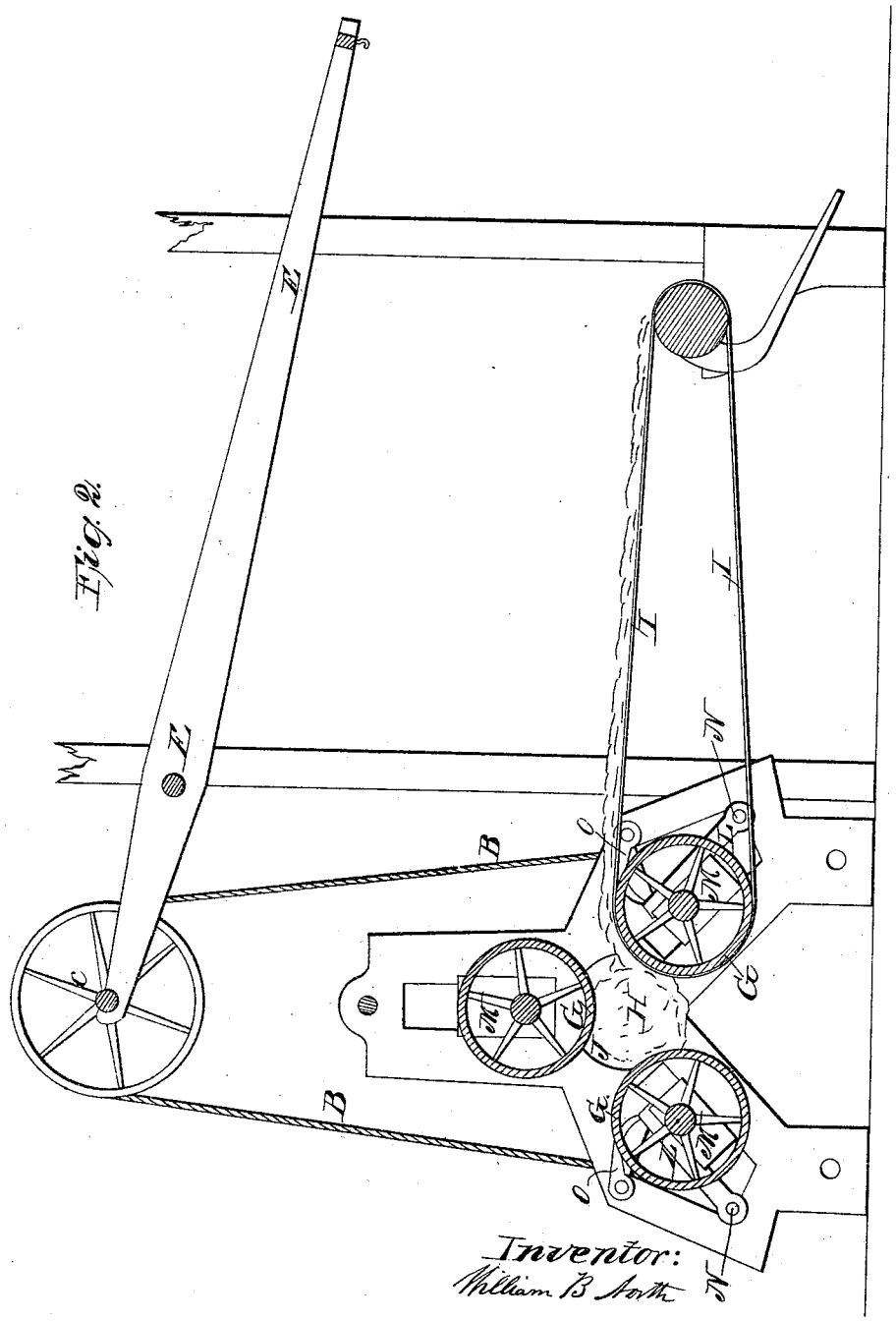

UNITED STATES PATENT OFFICE.

WILLIAM B. NORTH, OF JERSEY CITY, NEW JERSEY.

IMPROVEMENT IN COTTON-PRESSES.

Specification forming part of Letters Patent No. 5,632, dated June 13, 1848.

*To all whom it may concern:*

Be it known that I, WILLIAM B. NORTH, of Jersey City, in the county of Hudson and State of New Jersey, have invented a new and Improved Manner of Constructing a Press for the Pressing of Cotton; and I do hereby declare that the following is a full and exact description thereof.

The operating part of my press consists, mainly, of three or any other convenient number of iron or wood cylinders, the length of each of which is to be equal to that of the bale that they are intended to form. These cylinders are placed at equal distance apart and parallel to each other, so that lines joining their axes would form an equilateral triangle. When used for pressing, they, in the first instance, approach so nearly together as to bring their peripheries nearly into contact with each other, they being made to approach each other by means of a weighted lever or levers, while they are so suspended as to be capable of receding from each other as the cotton which is to form the bale accumulates between them. The cotton may be fed in between them directly from the cotton-gin by means of an endless apron, the width of which is equal to that of the length of the rollers, one of which will serve to carry the inner end of the endless apron. The cotton passes into the space between the iron or wood rollers, and by their revolution is caused to roll upon itself, so as to form a cylindrical bale, which goes on accumulating until the quantity is as great as is desired. At this time the cylinders will have been forced so far apart as to admit of the ready securing of the bale, for which purpose the canvas and ropes are passed in so as to surround the cotton, and are then made fast in the usual way.

In the accompanying drawings, Figure 1 is an end elevation of my press; and Fig. 2, a vertical section thereof in the plane of the end elevation, Fig. 1.

A A A are three grooved pulleys made fast to the axles of the three pressing-rollers at each of their ends. These receive a rope or chain, B B, which may pass around them in the manner represented in the drawings, and also around the tightening-pulley C and the auxiliary pulley D, which is situated on the fulcrum of the lever E, that is heavily weighted at F, for the purpose of causing the pressing-cylinders to approach each other with the requisite degree of force. The manner in which the pulleys, rope, and weight operate in producing this effect will be manifest from the inspection of the figure.

G G G are the pressing-rollers in the act of forming a bale, H, in the space between them. I I is the endless feeding-apron by which the cotton to be baled is conveyed from the gin-house or elsewhere to the press.

The dotted line J J shows the place of a flat disk of iron, of which there is one at each end of the machine, which may be held in place and turn upon a bolt, K. These serve to form the ends of the bale flat. The bale, when formed, is to be allowed to fall down between the two lower pressing-rollers, which, for this purpose, are made capable of being removed to a sufficient distance from each other. This I effect in the following way:

L L are parts of the checks of the frame that serve as guides to the slides M M, that direct the sliding blocks M M, that receive the gudgeons of the pressing-rollers. These work on joint-pins at N, and are held in place by the catches *o o*. When these catches are removed, the two lower pressing-rollers, G G, may be moved out laterally and the bale allowed to fall through.

Having thus fully described the manner in which I construct my press for the pressing of cotton so as to form bales, what I claim therein as new, and desire to secure by Letters Patent, is—

The so combining of three or any other convenient number of iron or wood rollers as that said rollers may be made to approach and recede from each other in a manner substantially the same with that herein represented and described, the cotton to be pressed being carried into the space between said rollers by means of an endless feeding-apron and rolled upon itself in successive layers until the required quantity has been accumulated, as herein set forth.

WILLIAM B. NORTH.

Witnesses:
J. W. SCUDDER,
JOHN H. VOORHEES.